Fig. 2.

| SCALE | I | II | III | IV | V | VI | VII |
|---|---|---|---|---|---|---|---|
| .001 - .01 µA D.C. | 1 | 2 | 4 | 3 | 2 | 2 | 1 |
| .01 - .1 µA D.C. | 1 | 2 | 4 | 2 | 2 | 2 | 1 |
| .1 - 1.0 µA D.C. | 1 | 2 | 4 | 1 | 2 | 2 | 1 |
| 1.0 - 10.0 µA D.C. | 1 | 2 | 1 | 1 | 1 | 2 | 1 |
| 10 - 100 µA D.C. | 1 | 2 | 2 | 1 | 1 | 2 | 1 |
| 100 - 1000 µA D.C. | 1 | 2 | 3 | 1 | 1 | 2 | 1 |
| 1.0 - 10 mA D.C. | 1 | 2 | 3 | 2 | 1 | 2 | 2 |
| 10 - 30 mA D.C. | 1 | 2 | 3 | 1 | 1 | 2 | 2 |
| 1 - 10 mV A.C. | 1 | 1 | | | 1 | 1 | 1 |
| .01 - .1 V D.C. | 1 | 2 | 1 | 1 | 1 | 2 | 1 |
| .1 - 10 V D.C. | 1 | 2 | 1 | 2 | 1 | 2 | 2 |
| 1.0 - 10.0 V D.C. | 1 | 2 | 1 | 1 | 1 | 2 | 2 |
| SIGNAL GROUND | 3 | 2 | 3 | 1 | 1 | 2 | 1 |
| SIGNAL TEST A.C. | 2 | 1 | | | 1 | 1 | 1 |
| SIGNAL TEST D.C. | 2 | 2 | 3 | 1 | 1 | 2 | 1 |

INVENTORS
Edward Sarkisian &
Nicholas J. Amdur
BY
ATTORNEY

United States Patent Office 3,541,462
Patented Nov. 17, 1970

3,541,462
APPARATUS FOR MEASURING LOW VOLTAGES AND CURRENTS WITH AMPLIFIER PROTECTIVE MEANS
Edward Sarkisian, Weston, and Nicholas J. Amdur, Watertown, Mass., assignors to RCA Corporation, a corporation of Delaware
Filed Dec. 28, 1967, Ser. No. 694,169
Int. Cl. H03f 1/34, 3/10
U.S. Cl. 330—11       4 Claims

ABSTRACT OF THE DISCLOSURE

Apparatus including operational amplifiers is disclosed for measuring direct current from about a thousandth of a microampere to about 30 milliamperes and for measuring about one millivolt to about 10 volts D.C. and for measuring A.C. voltage from about 1 millivolt to 10 millivolts, the disclosed apparatus including means substantially to eliminate the effect of noise voltages on the accuracy of the D.C. measurements and means to prevent an operational amplifier from becoming paralyzed if an overvoltage is applied thereto.

BACKGROUND

Figure 1:
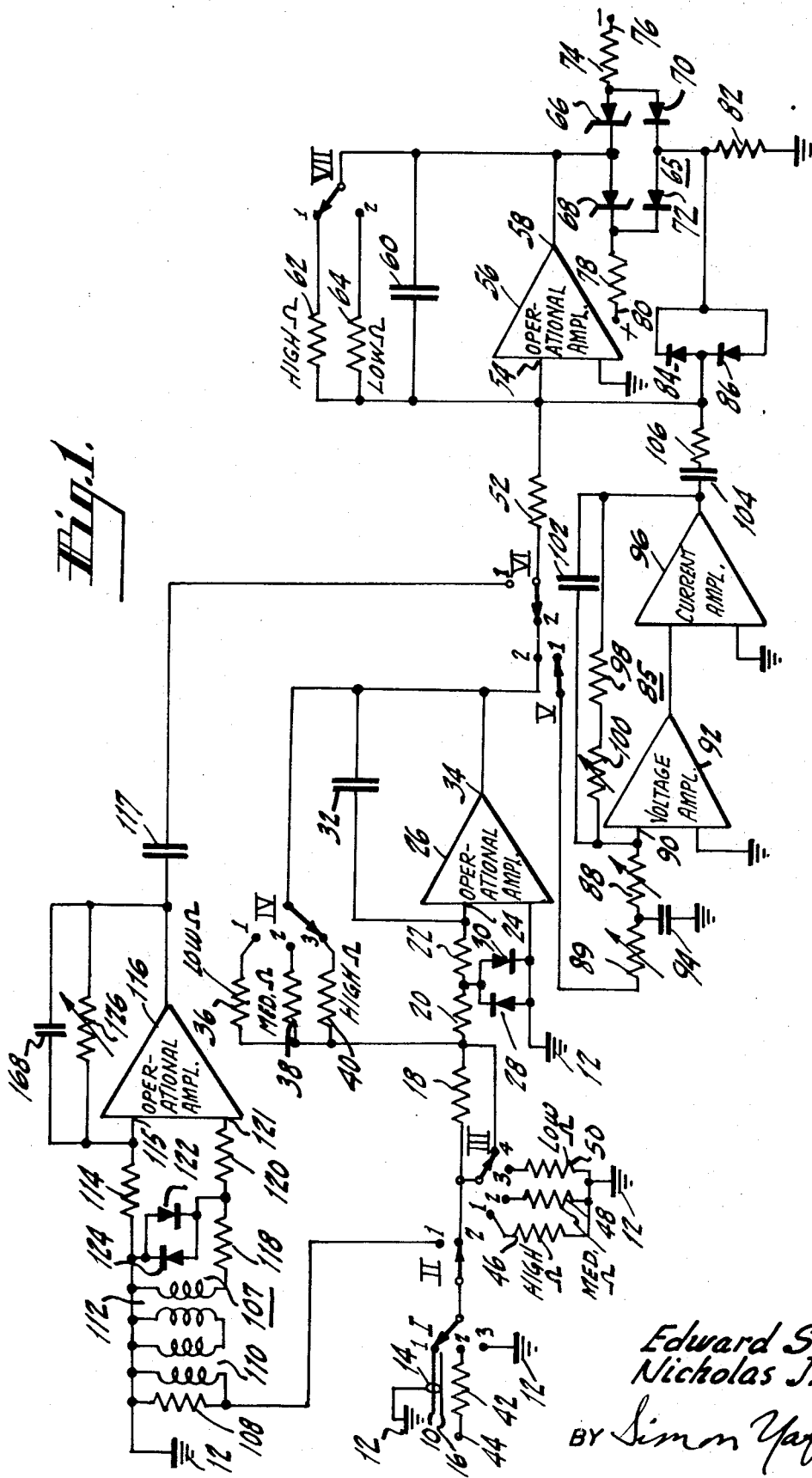

The invention relates to quick, real time, current and voltage measurements of small currents and voltages in the presence of electrical noise.

Current and voltage measuring apparatus including operational amplifiers are known. An operational amplifier may be defined as a high input impedance, low output impedance D.C. amplifier having a high amplification factor, in which the input and output terminals of the amplifier are coupled together through a feedback impedance. For current and voltage measuring, the feedback impedance is normally a resistor, with capacitance added to prevent unwanted oscillation. By adjustment of the relative sizes of an input resistor, which is normally connected between the source of current or voltage to be measured and an input terminal of the operational amplifier, and the feedback resistor, a voltage can be produced at the output terminal of the operational amplifier which is related to the input current or voltage by a factor dependent on the ratio of the input and feedback resistors. Therefore, by use of an operational amplifier or amplifiers, an input current or voltage may be transformed from one range to another range which can be conveniently measured with available volt meters. However, when the input voltage to be measured is very low, electrical noises that are applied to the operational amplifier or amplifiers can so mask the input voltage as to prevent correct measuring thereof. Furthermore, operational amplifiers of the D.C. type suffer from offset and from drift. The output of the D.C. operational amplifier may not read zero when the input voltage is zero, that is, the output voltage is offset from its true value. Also, the amount of offset may change as time goes on, that is, the offset may drift. To prevent the occurrence of offset and drift, a chopper is included in the amplifier. The direct input voltage or current is applied to both the direct current amplifier and to the chopper. The alternating current output of the chopper is amplified, the amplified current is rectified, and the rectified current is applied to a point in the direct current amplifier in such a manner that the offset and drift that would appear at the output of the direct current amplifier are neutralized. Such chopping type operational amplifiers include capacitors which may be so highly charged, when an overvoltage or overcurrent is applied to the input of the operational amplifier, that the chopper type operational amplifier may be paralyzed for periods of time up to 45 seconds. Therefore, with known measuring equipment using operational amplifiers, the measuring system may be paralyzed if the wrong scale is initially selected. This becomes increasingly important when the correct range is unknown, whereby it may be necessary to try several scales before the correct one is found. Such paralysis prevents use of the equipment for as long a time as it takes for the capacitors to discharge whereby the measuring equipment may not be useful to measure a voltage or current until after the voltage or current has disappeared.

It is an object of this invention to provide an improved voltage or current measuring device including operational amplifiers.

It is another object of this invention to provide a voltage or current measuring device in which accurate measurements may be made despite the occurrence of electrical noises in the vicinity of the device.

It is still another object of this invention to provide a voltage or current measuring device which will not become paralyzed if the input voltage or current is above the range of voltages or currents for which the device is set.

It is yet another object of this invention to provide a circuit which will not become paralyzed if the input current or voltage is above a certain value.

In accordance with the invention, a current to be measured is applied to an operational amplifier, and the A.C. component or noise at the output thereof is amplified by an amplification factor of one and is reversed in phase and is applied to a junction point at which the output of the operational amplifier is applied, whereby the A.C. component of noise is balanced out. Furthermore, in accordance with this invention, an impedance network which is high in comparison with the highest feedback resistor used with an operational amplifier is put in parallel with the feedback resistor. This high value impedance network is so constructed and arranged that if the voltage drop across it becomes greater than a limiting value which will not paralyze the operational amplifier, the high impedance network decreases its impedance value to so low a value as to reduce the voltage applied to the operational amplifier to a voltage that will not overload or cause paralysis of the operational amplifier.

Furthermore, means are provided to select a harmonic from a wave that is rich in harmonics and to measure the amplitude of this harmonic.

The invention will be better understood upon reading the following description in connection with the accompanying drawing, in which FIG. 1 is a schematic circuit diagram partially in block form of an operational amplifier circuit including this invention; and FIG. 2 is a table of functions and of switch settings for the circuit of FIG. 1 to accomplish the corresponding function.

In FIG. 1, the current or voltage to be measured is applied to a terminal 10 with respect to ground or to reference potential 12. As indicated by the circle 14 and by the line 16, the lead connected to the terminal 10 may be shielded and the shield may be grounded. While other grounded shields are not shown in FIG. 1 to avoid cluttering up the drawing, it is understood that when necessary all conductors and all elements may be carefully shielded.

The terminal 10 is connected to the terminal 1 of a switch I, the switch I having three terminals 1, 2 and 3. The terminal 2 of the switch I, (I–2) is connected through a standard resistor 42 to a terminal 44 to which a test signal may be applied. The terminal I-3 is connected to ground 12. The moving element of the switch I is connected to the moving element of a switch II having two terminals 1 and 2. Terminal II-2 is connected through three resistors 18, 20 and 22 in series to an input terminal 24 of an operational amplifier 26. The cathode of a diode 28 is connected to the junction of the resistors 20 and 22 and to the anode of the diode 30. The anode of the diode 28 and the cathode of the diode 30 are connected together and to the ground terminal of the operational amplifier 26 and to ground 12. A filter capacitor 32 is connected between the output terminal 34 and the input terminal 24 of the operational amplifier 26. The output terminal 34 is also connected to the moving element of a switch IV, the switch IV having terminals 1, 2 and 3. The junction of the resistors 18 and 20 is connected through respective resistors 36, 38 and 40 to the switch terminals or points IX–1, IV–2 and IV–3. The resistor 40 may be of higher resistance than the resistor 38 which in turn may be of higher resistance than the resistor 36.

The moving element of a switch III is connected to the switch terminal II–2. The switch III has four terminals 1, 2, 3 and 4. Switch terminals III–1, III–2, III–3 are connected through respective resistors 46, 48 and 50 to ground 12. Switch terminal III–4 is connected to the junction of the resistors 18 and 20. Resistor 46 is larger than resistor 48 which in turn is larger than resistor 50.

The output terminal 34 of the operational amplifier 26 is connected to a terminal 2 of a switch V. The terminal V–2 is connected to terminal 2 of switch VI. The movable element of switch VI is connected through a resistor 52 to an input terminal 54 of an operational amplifier 56. The output terminal 58 of the operational amplifier 56 is connected through a filtering capacity 60 to the input terminal 54. The output terminal 58 is also connected to the moving element of a switch VII which has two terminals 1 and 2. The terminals VII–1 and VII–2 are connected to the terminal 54 by respective resistors 62 and 64, the resistor 62 being greater than the resistor 64.

The output terminal 58 is connected to the input terminal 54 of the operational amplifier 56 by way of a threshold circuit 65 having very high resistance for any voltages applied thereto below a threshold voltage and low resistance for voltages applied thereto above the threshold voltage. This threshold circuit 65 comprises a connection from the output terminal 58 to the cathode of a voltage breakdown device such as a Zener diode 66 and to the anode of another Zener diode 68. The anode of the Zener diode 66 is connected to the anode of a rectifier diode 70 whose cathode is connected to the anode of a second rectifier diode 72. The cathode of the diodes 72 and 68 are connected directly together. The anode of the diode 66 is connected through a resistor 74 to the terminal 76 of a source of potential (not shown) which is negative with respect to ground. The cathode of the diode 68 is connected through a resistor 78 to a terminal 80 of a source of potential (not shown) which is positive with respect to ground. The junction of the diodes 70 and 72 is connected to ground through a resistor 82. The junction of the diodes 70 and 72 is also connected to the cathode of a diode 84 and to the anode of a diode 86, the anode of the diode 84 and the cathode of the diode 86 being connected together. The junction point of the cathode of the diode 86 and the anode of the diode 84 is connected to the input terminal 54 of the operational amplifier 56. The purpose and operation of the threshold circuit 65 will be explained hereinafter.

The moving element of the switch V is connected to a dynamic filter 85. The dynamic filter 85 includes a variable resistor 89 and another variable resistor 88 in series therewith. The resistor 88 is connected to the input terminal 90 of an voltage amplifier 92. The junction of the resistor 89 and 88 is connected to ground through a capacitor 94. The output of the amplifier 92 is connected to the input terminal of a current amplifier 96. The output of the amplifier 96 is connected to the input 90 of the amplifier 92 by way of a resistor 98 and a variable resistor 100 in series. The resistors 98 and 100 are shunted by a filter capacitor 102. The output of the amplifier 96 is connected to the input terminal 54 of the operational amplifier 56 through a blocking capacitor 104 and a resistor 106 in series. As will be explained, the dynamic filter 85 acts to reduce electrical noises present in the described circuit that would make invalid low direct current measurements by the described apparatus.

The contact or switch point II–1 is connected through a filter network 107 to the input terminals 115 and 121 of an operational amplifier 116. The filter 107 comprises a resistor 108 one of whose end terminals is connected to the switch point II–1 and the other of whose end terminals is connected to ground 12. The filter 107 also includes the primary winding of a transformer 110 which is connected across the resistor 108. The secondary winding of the transformer 110 and the primary winding of a transformer 112 are connected in series, a junction point between these windings being also connected to ground 12. A terminal of the secondary winding of the transformer 112 is connected to ground. The output of the filter 107 is connected to the input terminals 115 and 121 by way of an input resistor 114 which is connected between ground and input terminal 115 of the operational amplifier 116 and by way of two resistors 118 and 120 in series which are connected between the ungrounded terminal of the secondary winding of the transformer 112 and another terminal 121 of the operational amplifier 116. The junction of the resistors 118 and 120 is connected to the cathode of a protective diode 122 and to the anode of another protective diode 124. The anode of the diode 122 and the cathode of the diode 124 are connected together and to the ground terminal 12.

The output terminal of the operational amplifier 116 is connected to the input terminal 115 thereof through a variable resistor 126 and a bypass capacitor 168 in parallel. The output terminal of the operational amplifier 116 is also connected to the terminal 1 of switch VI through a capacitor 117.

As will be evident upon consideration of FIGS. 1 and 2, the switches I–VII of the circuit of FIG. 1 may be set to cause the circuit of FIG. 1 to produce several distinct measuring functions. The operation of the circuit of FIG. 1, with the several switches set in different positions, will now be explained.

Let it first be assured that the switches I–VII are set in the positions noted in the line of FIG. 2 labelled ".001 to .01 $\mu$a.D.C." Then, a very small direct current to be measured will flow into the operational amplifier 26 through the resistors 20 and 22, the resistor 18 being shorted by the switch III. No input is supplied to the operational amplifier 116 due to the position of the switch II. If the voltage produced by the input current is greater than the threshold voltage of one of the diodes 28 or 30 in its forward direction, current will flow in that one of the diodes 28 or 30, limiting the voltage applied to the operational amplifier 26 to this threshold value, whereby the operational amplifier 26 is protected from overvoltage. In a known manner, the voltage at the output 34 of the operational amplifier 26 is related to the current flowing into the terminal 10 and is determined by the value of resistor 40 in this setting of the several switches. The output voltage is equal to the input current times the feedback resistance. The resistors 20 and 22 and the diodes 28 and 30 are merely a protective circuit.

As will be noted by a glance at both FIGS. 1 and 2, when a small D.C. voltage is to be measured, the dynamic filter 85 is connetced in the circuit. It is almost impossible to avoid picking up electrical noises by electrical equipment. At the low range of current measurements, the noise voltages induced into the equipment becomes sufficiently high so as to make such measurement inaccurate. To avoid the effect of these induced electrical noise voltages, the dynamic filter 85 which comprises the elements 88 to 106 is used.

The voltages at the output of the opeartional amplifier 26 are applied to the dynamic filter 85 when the switch V is in its 2 position. The phase of the A.C. component of the wave so applied to the dynamic filter is adjusted by the variation of the resistor 89 so that the wave applied by the output terminal of the dynamic filter 85, which is connected to the input terminal 54 of the operational amplifier 56, is exactly 180° out of phase with the input voltage. The amplification factor of the cascade amplifier 92 and 96 is adjusted to be exactly unity by the adjustment of the feedback resistor 100. The direct current component of the wave applied to the dynamic amplifier 85 is removed by the blocking capacitor 104. Therefore, the wave applied by the dynamic filter 85 to the input terminal 54 of the operational amplifier 56 is exactly out of phase and exactly equal in amplitude to the variable A.C. noise component appearing at terminal 34 of the operational amplifier 26. By use of the dynamic filter 85, measurements of low D.C. voltages are therefore not rendered incorrect by electrical noise than cannot be shielded out of the measuring apparatus.

The output of the operational amplifier 26 is fed into the input terminal 54 of the opeartional amplifier 56, and, in a known manner, the voltage at the output 58 of the operational amplifier 56 depends upon the ratio of the feedback resistor 62 and the input resistor 52. The voltage at the terminal 58 of the operational amplifier 56 is in a useful range, for example, 0 to 10 volts, that can be readily measured by standard voltmeters or applied to automatic data collection systems. This voltage, as shown by a voltmeter, is a measure of the voltage or current applied at the terminal 10, this measure being determined by the positions of the switches III, IV and VII. For measuring direct voltages or currents in other ranges, the several switches are set as indicated in FIG. 2. It will be noted that the dynamic filter 85 may be used only for the three lowest direct current ranges.

If the input voltage applied to the terminal 54 were such as to drive the voltage at the output terminal 58 to a voltage above the useful range, the operational amplifier 56 may become paralyzed, that is, the voltage at the terminal 58 thereof would not respond to voltage applied to the terminal 54 thereof, and until the paralysis had disappeared, the operational amplifier 56 would be useless. This paralysis of the operational amplifier 56 is due to charging up of capacitors (not shown) comprising parts of the chopper-stabilized operational amplifier 56, to a voltage too high to permit proper operation of the operational amplifier 56. This paralysis will pass if the capacitors are allowed to discharge, however during the time the paralysis lasts, the current or voltage that is being measured may disappear. By connecting a threhold device 65 across the terminals 58 and 54, this paralysis may be avoided. However, any threshold device 65 that is connected across the operational amplifier 56 will be in parallel with one of the resistors 64 or 62. If the resistance of the threshold device 65 is too low, then the presence of the threshold device 65 will render incorrect any measurements made by the operational amplifier 56. For the threshold device 65 to prevent paralysis of the operational amplifier 56, the threshold device 65 must break down at a voltage only slightly higher than the operating range of voltages of the operational amplifier 56. For the threshold device 65 not to affect the validity of the measurements made by the operational amplifier 56, the threshold device 65 must have an impedance when not broken down of many times the resistance of the higher of the feedback resistors 62 or 64 that is used with the amplifier 56. In one useful measuring system, the threshold break down device or circuit 65 must have a resistance of at least 10 million ohms when not broken down.

Considering the threshold device 65, it will be noted that the elements 66 to 80 comprise a first impedance and that the elements 84 and 86 comprise a second impedance. The two impedances are connected in series between the output terminal 58 and the input terminal 54, and the resistor 82 is connected between the junction of the first impedance and second impedance and ground. That is, the element 66 to 86 comprise a T-network connected between the output terminal 58 and the input terminal 54. Where the T-network comprising the elements 66 to 86 is connected between the output terminal 58 and the input terminal 54 of the operational amplifier 56, whose open loop amplification factor is very high (about 50 millions) and whose input and feedback currents are substantially equal, it can be shown mathematically that the resistance of the T-network so connected is equal to the resistance of the elements 84 and 86 multiplied by a binomial factor equal to one plus the ratio of the resistance of the first impedance comprising the elements 66 to 78 to the resistance of the shunt resistor 82; plus the resistance of the first impedance 66–78. The resistance of the elements 84 and 86, since the voltage applied thereto is less than their forward conduction voltage may be in the order of $10^{11}$ ohms and the resistance of the resistor 82 may be in the order of 1,000 ohms. Since the diode 70 and 72 may be of the low leakage current planar type and since the diodes 70 and 72 are back biased through their respective resistors 74 and 78, their resistance also can be in the order of $10^{11}$ ohms. Therefore, the resistance of the elements 66 to 86 comprising the threshold circuit 65 can be very high compared to the feedback resistor 62 when the Zener diodes 66 and 68 are not broken down. Since, when the threshold network 65 is in its high resistance state, the resistance of the threshold circuit 65 is very high compared to the resistance of the resistor 62, its presence does not affect the validity of the measurements made with the operational amplifier 56. However, if the voltage developed across the terminals 58 and 54 of the operational amplifier 56 is outside of the operating range for the operational amplifier 56, the voltage applied across the Zener diodes 66 and 68 will be in the direction and of a value to break one of them down. That is, if the voltage applied to the input terminal 54 of the operational amplifier 56 is so great that the operational amplifier 56 would, in the absence of the voltage threshold circuit 65, be paralyzed, the voltage at the output terminal 58 will be sufficiently great to break down one of the Zener diodes 66 or 68 and the voltage would therefore limit at a value slightly greater than the operating value of the operational amplifier 56. One of the diodes 70 or 72 would no longer be back biased if a respective Zener diode 66 or 68 were broken down, whereby the resistance of the now not back biased diode would be low in its forward direction. A voltage would then be applied across the diodes 84 and 86, and the one thereof that is biased in its forward direction will exhibit low resistance, whereby the threshold circuit 65 would exhibit low resistance and whereby the voltage at the output 58 of the operational amplifier 56 would drop to a value just above the operating range of the operational amplifier 56. The operational amplifier 56 would then not be paralyzed. However, the fact that the voltage at the terminal 58 is above the range of the operational amplifier 56 would show that a change in the scale, in accordance with the switch settings shown in FIG. 2, to a higher range is necessary. If the voltage at the terminal 58 remained above the operating range of the amplifier 56, the switches would then be adjusted until the voltage at the terminal 58 fell to a point in the operating range of the amplifier 56. Since the operational amplifier 56 is not paralyzed it responds immediately to the voltage applied thereto and a still existing voltage or current can be measured by the described apparatus, whereby the measurement can be made in real time.

In testing for the cutoff voltage of certain vacuum tubes, operating voltage is applied between the anode and cathode of the tube, and a cutoff bias voltage is applied to the control grid thereof. However, even when the tube is cutoff, leakage currents will flow between the several electrodes of the tube and appear in the cathode circuit of the tube, whereby the cutoff point may not be ascertainable by measuring the current flowing in the cathode circuit of the tube. It has been suggested that an A.C. voltage at a fundamental frequency be applied, with the D.C. cutoff voltage, to the control grid. The output current of the tube at cutoff is then a rectified pulsating current at the fundamental frequency on top of the direct leakage current. However, interelectrode capacity will produce leakage currents at the fundamental frequency which will contribute to the pulsating current output. This pulsating current is very rich in harmonics. However, the interelectrode capacity will contribute little or nothing of the harmonics of the pulsating currents. Since the leakage current will not contribute to the pulsating current, by measuring the harmonic content of the pulsating current, the cutoff voltage of the tube may be determined.

A high frequency A.C. signal will produce a stable output more quickly than a low frequency signal, whereby, for speed of determining cutoff it is advisable to select a harmonic of the pulsating wave. Since the interelectrode capacity contributes little or nothing to the harmonic component of the output wave, the presence of the harmonic wave determines the true cutoff voltage of the tube. Therefore testing for the presence of a harmonic of the fundamental frequency contributes both speed and accuracy to the cutoff test of the tube.

The pulsating wave derived in making such cutoff tests may be applied to the terminal 10 of the described apparatus and the switches may be set in accordance with the line "1–10 m. v. A.C." in FIG. 2. The pulsating wave will then be applied to the filter 107, which will select a harmonic, such as the 2nd harmonic, of the alternating current applied to the control grid of the tubes. As noted above, the presence of a measurable harmonic voltage at the output of the operational amplifier 56 indicates the application of a cutoff voltage the grid of the tube being tested. The positions of switches III, IV in this test portion are not important.

If it is desired to test to see if the output voltage is a zero when the input is grounded, the switches may be arranged as indicated in the line marked "Signal Ground" in FIG. 2.

If it is desired to test the equipment for its operation when a known A.C. voltage signal is applied to the input terminal 44 thereof, the switches are set at the position shown by the line of FIG. 2 labelled "Signal Test A.C." In this position a standard A.C. voltage is applied to the terminal 44 and, though the standard resistance 42, to the input of the filter 107. By varying the frequency of the applied input, the bandpass of the filter 107 may be plotted.

The final line of the chart of FIG. 2 shows the settings of the switches when the response of the equipment to a standard D.C. voltage, which may be connected to the terminal 44, is to be determined. However, each D.C. voltage scale may be verified by changing the switch positions and by changing the value of the standard input voltage that is applied to the terminal 44 to a value corresponding to the changed scale.

Modifications of the described measuring equipment will occur to a person skilled in the art. The above description is to be taken as illustrative and not in a limiting sense.

What is claimed is:

1. Protective means for preventing an operational amplifier having a resistor connected between an input and output terminal from becoming paralyzed, comprising a first and a second voltage breakdown device each having the same unlike terminals,
first means for connecting an electrode of said first breakdown device to an unlike electrode of said second breakdown device,
second means for connecting said output terminal of said operational amplifier to said first means,
a first and second diode each having the same unlike electrodes,
third means for connecting an electrode of said first diode to an unlike electrode of said second diode,
fourth means for connecting the remaining electrode of said first breakdown device to the remaining electrode of said first diode,
fifth means for connecting the remaining electrode of said second breakdown device to the remaining electrode of said second diode,
a resistor connected between said third means and a point of reference potential,
a third and fourth diode each having the same unlike electrodes,
sixth means for connecting one electrode of said third diode to an unlike electrode of said fourth diode,
seventh means for connecting the remaining electrodes of said third and fourth diodes,
a connection from said third means to one of said respective sixth or seventh means, and
eighth means for connecting the other one of said sixth and seventh means to the input terminal of said operational amplifier.

2. A circuit comprising an operational amplifier having input, output and reference terminals,
means to apply a current or voltage to be measured to said input terminal through an input resistance,
means including another resistance for feeding back the voltage appearing at said output terminal to said input terminal, and
protective means connected between said input and output terminals including a first, a second and a third impedance means each having a pair of terminals, one terminal of said first impedance means being connected to said output terminal of said operational amplifier, one terminal of said second impedance means being connected to said input terminal of said operational amplifier, and the other terminals of said first and second impedance means being connected together and to one terminal of said third impedance means, the other terminal of said third impedance means being connected to said reference terminal, said impedance means being resistive,
said first impedance means including a pair of diodes and means for back biasing said diodes and in which a terminal of one diode is connected to an unlike terminal of another diode and further in which said first impedance means also includes a pair of voltage breakdown devices connected across said diodes, said connection of said first impedance means to said output terminal being between said breakdown devices, and said connection to said second and third impedance means being between said diodes.

3. The invention as expressed in claim 2 wherein said second impedance means includes a pair of diodes each having a cathode and anode in which the anode of each diode is connected to the cathode of the other diode, the connection of said second impedance means to said first impedance means being to one of the anode or cathode of one of said pair of diodes in said second impedance means and the connection to said input terminal of said operaitonal amplifier being to said other one of said anode or cathode of said one diode in said second impedance means.

4. A circuit according to claim 2, wherein
said means to apply a current or voltage to be measured includes a second terminal to which is applied a signal having said current or voltage to be measured with an A.C. and D.C. component, and means for connecting said second terminal to said input terminal including said input resistance.

said circuit further comprising a dynamic filter coupler across said input resistance, said dynamic filter comprising means to amplify by a factor of one and change the phase by substantially 180 degrees of the signal appearing at said second terminal, and means coupled between said amplifying phase changing means and said input terminal for blocking the D.C. component of said amplified signal and to apply the phase shifted and amplified A.C. component to said input terminal for concelling the A.C. component of said signal appearing at said input terminal.

References Cited
UNITED STATES PATENTS

| | | | |
|---|---|---|---|
| 3,072,842 | 1/1963 | Vaughn | 307—202 X |
| 3,185,934 | 5/1965 | Patmore et al. | 330—19 |
| 3,187,267 | 6/1965 | Merington | 330—110 |
| 3,058,068 | 10/1962 | Hinrichs et al. | 330—70 |
| 3,166,720 | 1/1965 | Rosen et al. | 330—110 |
| 3,268,830 | 8/1966 | Ragsdale | 330—110 |

NATHAN KAUFMAN, Primary Examiner

U.S. Cl. X.R.

330—9, 110

UNITED STATES PATENT OFFICE
CERTIFICATE OF CORRECTION

Patent No. 3,541,462        Dated November 17, 1970

Inventor(s)   Edward Sarkisian and Nicholas J. Amdur

It is certified that error appears in the above-identified patent and that said Letters Patent are hereby corrected as shown below:

Column 3, line 13 "IX-1" should read --IV-1--

Column 8, line 48 reads "said impedance means being resi: should read --said third impedance means being resistive Signed and sealed this 15th day of June 1971.

(SEAL)
Attest:

EDWARD M. FLETCHER, JR.
Attesting Officer

WILLIAM E. SCHUYLER, J
Commissioner of Patent